US008196432B2

(12) United States Patent
Jacques et al.

(10) Patent No.: US 8,196,432 B2
(45) Date of Patent: *Jun. 12, 2012

(54) FURNACE WITH SERIES-ARRANGED BATHS FOR PRODUCING GLASS COMPOUNDS HAVING A LOW DEGREE OF UNMELTED MATERIAL

(75) Inventors: Remi Jacques, Estrees Saint-Denis (FR); Pierre Jeanvoine, Poissy (FR); Biagio Palmieri, Cheverny (FR)

(73) Assignee: Saint-Gobain Glass France, Courbevoie (FR)

( * ) Notice: Subject to any disclaimer, the term of this patent is extended or adjusted under 35 U.S.C. 154(b) by 1011 days.

This patent is subject to a terminal disclaimer.

(21) Appl. No.: 10/522,723

(22) PCT Filed: Jul. 30, 2003

(86) PCT No.: PCT/FR03/02414
§ 371 (c)(1),
(2), (4) Date: Sep. 20, 2005

(87) PCT Pub. No.: WO2004/013056
PCT Pub. Date: Feb. 12, 2004

(65) Prior Publication Data
US 2006/0105899 A1    May 18, 2006

(30) Foreign Application Priority Data
Jul. 31, 2002   (FR) .................................... 02 09728

(51) Int. Cl.
*C03B 5/00* (2006.01)
(52) U.S. Cl. .................... 65/134.1; 65/134.3; 65/134.5; 65/135.4; 65/136.1; 65/136.2; 65/136.3; 501/56; 501/65; 501/77

(58) Field of Classification Search ............ 65/134.1, 65/134.4, 134.5, 134.6, 335, 136.4, 136.1, 65/135.9; 501/56, 65, 77
See application file for complete search history.

(56) References Cited

U.S. PATENT DOCUMENTS 1,596,058 A * 8/1926 Mambourg .................. 65/136.4
2,492,523 A * 12/1949 Coffeen et al. ............... 428/433
(Continued)

FOREIGN PATENT DOCUMENTS
EP        0 738 692       10/1996
(Continued)

OTHER PUBLICATIONS

Defention of "Burner"; http://www.merriam-webster.com/dictionary/burner.*

*Primary Examiner* — Richard Crispino
*Assistant Examiner* — Elizabeth Royston
(74) *Attorney, Agent, or Firm* — Oblon, Spivak, McClelland, Maier & Neustadt, L.L.P.

(57) ABSTRACT

The invention relates to a furnace for the continuous melting of a composition comprising silica, the said furnace comprising at least two tanks in series, said tanks each comprising at least one burner submerged in the melt. The invention also relates to the process for manufacturing compositions comprising silica using the furnace, the silica and the fluxing agent for the silica being introduced into the first tank. The invention makes it possible to produce glass color frits, tile frits and enamel with a high productivity, low temperatures and short transition times.

29 Claims, 1 Drawing Sheet

U.S. PATENT DOCUMENTS

| | | | |
|---|---|---|---|
| 2,923,636 A * | 2/1960 | Swain | 501/71 |
| 3,024,121 A * | 3/1962 | Hagedorn | 501/71 |
| 3,170,781 A | 2/1965 | Keefer | |
| 3,203,816 A * | 8/1965 | Bull et al. | 501/71 |
| 3,244,495 A * | 4/1966 | Apple et al. | 65/161 |
| 3,429,684 A * | 2/1969 | Plumat | 65/335 |
| 3,627,504 A * | 12/1971 | Johnson et al. | 65/134.3 |
| 3,656,928 A | 4/1972 | Gimenez | |
| 3,760,051 A * | 9/1973 | Eirich et al. | 264/117 |
| 4,106,946 A * | 8/1978 | Ritze | 501/55 |
| 4,199,364 A * | 4/1980 | Neely | 501/35 |
| 4,312,951 A * | 1/1982 | Eppler | 501/24 |
| 4,358,304 A * | 11/1982 | Froberg | 65/27 |
| 4,427,429 A * | 1/1984 | Tiilikka | 65/33.3 |
| 4,632,687 A * | 12/1986 | Kunkle et al. | 65/27 |
| 4,820,328 A * | 4/1989 | Roberts et al. | 65/134.3 |
| 4,877,449 A | 10/1989 | Khinkis | |
| 4,994,099 A * | 2/1991 | Boettner | 65/134.9 |
| 5,630,369 A | 5/1997 | Edlinger | |
| 5,630,860 A * | 5/1997 | Sorg et al. | 65/135.1 |
| 5,908,703 A * | 6/1999 | Brix et al. | 428/426 |

FOREIGN PATENT DOCUMENTS

| | | |
|---|---|---|
| EP | 1 067 099 | 1/2001 |
| GB | 1 028 481 | 5/1966 |
| JP | 58 199728 | 11/1983 |
| WO | 95/32927 | 12/1995 |

* cited by examiner

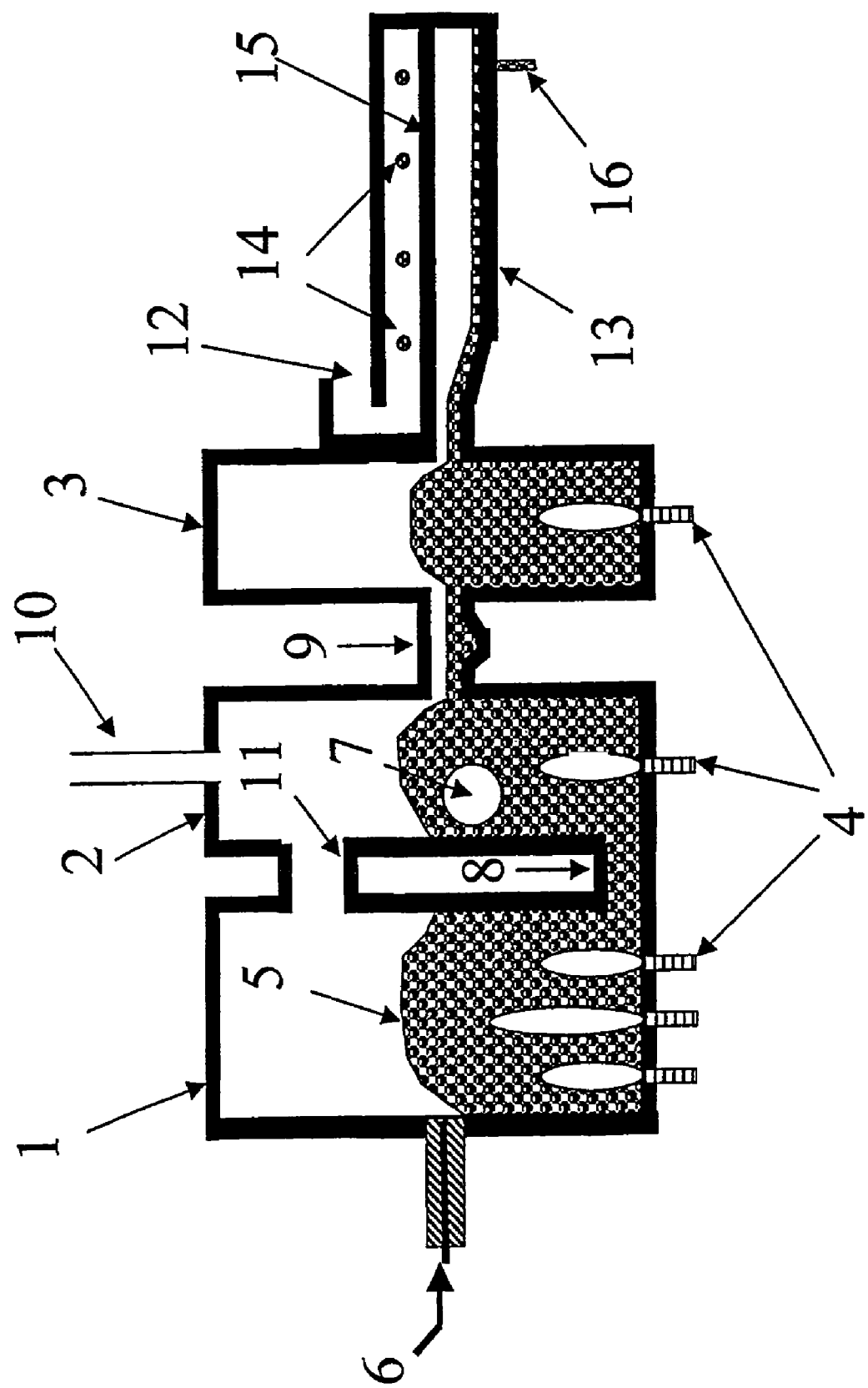

FURNACE WITH SERIES-ARRANGED BATHS FOR PRODUCING GLASS COMPOUNDS HAVING A LOW DEGREE OF UNMELTED MATERIAL

The present application is a U.S. National Stage Application, under 35 U.S.C. §371, of International Application No. PCT/FR2003/002414, filed on Jul. 30, 2003 and published as WO 2004/013056, and which claims priority to French Application No. 02/09728, filed on Jul. 31, 2002. The entire contents of both applications are incorporated herein by reference.

The invention relates to a furnace comprising several tanks in series, each equipped with at least one submerged burner, making it possible for compositions comprising silica to be melted effectively, that is to say with a low stone content and for a low energy consumption. The invention relates more particularly to the preparation of glass compositions such as glass frits, especially glass color frits, or frits used in the composition of enamels, glazes and engobes, such as the generally black enamel, which may contain manganese oxide, that is placed around the perimeter of automobile windows. It will be recalled that an enamel is a glass with a low melting point, which is intended to be applied as a coating on a substrate, which may be made of ceramic (in the case of a glaze), or glass or metal. These compositions may or may not contain coloring agents, opacifiers, or other additives used either for the bulk-coloring of other glasses or for the surface decoration of the ceramic, metal, glass or other substrates. In particular, the invention allows not only easy production of the frits for enamel that are described in EP 1 067 100 and EP 0 883 579, but also the direct production of said enamels.

Glass color frits are particular compositions that are added to another, matrix glass composition so as to incorporate an additive, such as a pigment, to said matrix composition. Usually, a glass color frit is in the form of glass lumps, generally square, with a volume ranging for example from 0.5 to 3 cm$^3$, said lumps being added to a glass melt flowing in a feeder of a forming station, for example one for forming hollowware (vials, bottles, etc.). These solid frits are thrown into the matrix glass melt, which is generally at between 1250 and 1350° C. The frit then melts and blends with the matrix glass composition if necessary under the action of homogenizing means such as stirrers. The color frit generally represents from 1 to 5% of the mass of the final glass. A colorant (or pigment), generally an oxide, is not added directly to the glass melt, as it would have a tendency to drop directly to the bottom and blend very poorly with the rest of the glass and would also suffer considerable fly-off owing to the effect of the powerful gas jets emanating from the burners. This is why glass color frits are used, as this improves homogenization within the matrix glass and prevents any fly-off owing to the effect of the gas jets.

The melting of the silica, especially for the purpose of producing glass frits or enamel, requires heating to a high temperature and for a long time so as to reduce the silica stone content, which involves the use of expensive materials and which is usually carried out with low productivity. Thus, it is known to produce a glass frit by melting in a pot (or crucible), which is heated by burners. To do this, it is necessary to heat to more than 1200° C. for 16 hours in order to reduce the stones to an acceptable level. In addition, such a technique is a batch technique. Moreover, when it is desired to switch from one composition to another in the case of two different manufacturing campaigns, a long time ("transition time") is required to clean the pot. This is because cleaning requires complete manufacture with a neutral glass (also called "clear glass") into which the residues from the previous campaign will be diluted. It is only after this intermediate manufacture of a glass, intended in fact to be scrapped, that the manufacture of the new composition can start. Moreover, this technique incurs considerable loss of materials, especially $B_2O_3$ and other oxides, since these materials have a tendency to be expelled from the mass of batch materials owing to the effect, on the one hand, of physical fly-off of the powders entrained by the gas jets produced by these burners and, on the other hand, following chemical reactions, especially between oxides and water or between oxides and fluxing agent, said chemical reactions giving rise to the formation of gases that condense in the cool parts of the furnace, such as the evacuation flues for the flue gases. These two phenomena both contribute to losses that result in a more unfavorable manufacturing material budget (comparison between the quantities introduced and the quantities obtained in the final composition).

The invention solves the abovementioned problems. The process according to the invention results in glass compositions with few stones, or even no stones, with a high productivity, low fly-off and short residence time of the batch materials. Furthermore, the transition times allowing one composition to be switched to another are very short. In particular, the invention generally allows lower temperatures to be used and therefore less expensive materials to be used. Thanks to the short transition times that it allows, the furnace according to the invention can also be used for preparing a ready-to-use enamel (for buildings or automobile windows or the like), i.e. an enamel obtained directly from its raw materials and then ground, and no longer, as in the case of the prior art, an enamel obtained by mixing the pigment with a ground frit.

According to the invention, arranging several reactors in series allows the temperature of the reactors to be considerably lowered while still maintaining the quality of the end product expressed in terms of stones, homogeneity and even general level of bubbling (i.e. the quantity of bubbles remaining trapped in the end product). This is a major advantage when the materials to be melted contain volatile elements such as boron oxide, zinc oxide, selenium oxide or the like, since in this case, emissions in the flue gases, generally increasing exponentially with temperature, are limited. Flue gas scrubbing is thereby facilitated.

The lower temperature of the reactors also has the advantage that there is less infiltration of glass into the interstices of the furnace refractories. This is because infiltrated melt solidifies rapidly in the refractories because of the lower temperature and blocks the interstices at a level closer to the interior of the furnace.

Another advantage of the invention lies in the fact that, since glasses and especially frits are highly corrosive with respect to the refractories, a low temperature level increases the lifetime of the furnace. It is thus possible to use a conventional glassmaking construction, namely with a refractory in contact with the molten glass and with an insulator placed behind said refractory. It is also possible to choose, for the entire furnace or only for part of it, a solution consisting in the use of an assembly comprising a refractory in contact with the molten glass melt, with a cooled metal plate being placed behind said refractory, this solution being recommended in the case in which lifetime is given preference over specific consumption, and this solution also eliminates any risk of flow out of the furnace because of the high fluidity of the compositions. The cooling may be achieved by running water over the outer part of the plate or by a coiled continuous water circulation pipe welded to said plate.

The process according to the invention involves the continuous melting of a composition comprising silica in a furnace comprising at least two tanks, and preferably three tanks, in series, said tanks each having at least one burner submerged in the melt, the first tank generally being heated to a higher temperature than the first. Silica and fluxing agent for the silica are introduced into the first tank. Generally speaking, most of the silica of the frit, i.e. at least 80% and preferably at least 90% by weight of the silica of the frit, and preferably all of it, is introduced into the first tank, which is generally hotter than the other tank or tanks of the furnace. Generally, at least 80%, preferably at least 90%, by weight, and even all of the fluxing agent for the silica is introduced into the first tank.

The function of the submerged burners is twofold, namely to heat the batch materials and homogenize the composition. Because of the vigorous mixing that they produce, the friction and splashing of the melt against the walls is usually the cause of wear of said walls, not only below the level of the melt but also above it, especially at the roof, because of considerable splashing. However, the invention helps to reduce this phenomenon significantly because of the lower temperatures that are needed, especially when only the first tank is at a high temperature for melting most of the silica effectively, the other tank or tanks that follow being heated to a more moderate temperature. Because of this more moderate temperature, the melt is more viscous and there is less splashing and movement of the melt, resulting in less wear of the walls. In addition, the more viscous melt has less of a tendency to infiltrate into the interstices or defects of the walls, thereby also making it easier to purge the furnace when the composition to be manufactured has to be changed (shorter transition time). Generally speaking, the first tank is heated to the highest temperature of the furnace, the other tank or tanks having either the same temperature or a lower temperature. In general, the tank or tanks after the first one have a temperature below that of the first, this difference generally being at least 80° C. and possibly up to, for example, 200° C.

The first tank is generally heated to a temperature ranging from 1000 to 1350° C., and more generally from 1230 to 1350° C., and the furnace includes at least one other tank heated to a temperature below 1150° C. The furnace therefore generally comprises at least two tanks having between them a temperature difference of at least 80° C., the first receiving most of the silica and being the hottest. According to the invention, the use of a single tank heated to the highest temperature followed by another tank heated to a lower temperature allows the batch materials to be melted effectively, with a very low, or even zero, final stone content. The silica grains are predominantly melted in the first tank. The grains that have not been entirely melted in the first tank are melted in at least one other tank that follows. Overall, the invention makes it possible to reduce the amount of expensive building materials to be used because of the lower temperatures needed and/or the high production rates, especially if at least one tank operates at a temperature below that of the first tank, while still ensuring the absence of stones, and with a high productivity.

The first tank is equipped with means for introducing the batch materials. In general, most of the silica needed for the production of the final composition and the fluxing agent for the silica are introduced into this first tank. This fluxing agent is generally $Na_2CO_3$, which is converted to $Na_2O$ during vitrification. A thinner such as $B_2O_3$ may also be introduced into this first tank. The first tank may also be fed with combustible scrap such as, for example, plastics, coal, spent oils, tire scrap, etc., so as to reduce the energy costs. The raw materials may be ground or micronized and have a fine particle size. However, because of its effectiveness in melting the batch materials (low stone content), the furnace may also be fed with natural raw materials having a relatively coarse particle size. On account of the intense stirring caused by the submerged burners, it is not essential to mix the raw materials before their introduction into each tank. This advantage may, for example, be used to preheat the silica, separately from the other raw materials, by the combustion flue gases, thereby reducing the energy cost.

It is possible to introduce all the batch materials into the first tank. However, it is preferred to introduce the batch materials other than the silica, the fluxing agent for the silica and the thinner into at least one tank located downstream of the first tank, and preferably into the tank located directly after the first tank, that is to say the second tank. Adding the batch materials other than the silica, the fluxing agent for the silica and the thinner into a tank downstream of the first tank reduces the phenomenon of fly-off of these materials. This is because, since the first tank is the hottest of the furnace, the introduction of these materials into another tank reduces fly-off of these materials because of the lower temperature of the feed tank.

Preferably, the thinner is also added to at least one tank located downstream of the first tank, and preferably in the tank located directly after the first tank, i.e. the second tank. This is more particularly recommended if the first tank is hotter than the other tank or tanks. This because if the thinner is added to the first tank, the viscosity of the glass, already quite low because of the high temperature, is further reduced. This is consequently conducive to increased movement of the molten glass, which further aggravates the problem of abrasion of the walls of the first tank. The fact that the thinner is not introduced into the first tank allows a higher viscosity to be maintained in the first tank. Moreover, as the thinner is introduced into at least one other tank at a lower temperature than the first tank, it is introduced at a point where the viscosity of the glass is higher because of the lower temperature and the reduction in viscosity that its addition causes can thus be more easily tolerated.

The invention also relates to a process for the continuous preparation of compositions comprising silica by melting in a furnace comprising at least two tanks in series, the said tanks each comprising at least one burner submerged in the melt, silica and fluxing agent for the silica being introduced into the first tank, at least 90% of the silica and at least 90% of the fluxing agent for the silica being introduced into the first tank, the furnace being fed with thinner, at least 90% of which is introduced into the second tank of the furnace.

The batch materials other than the silica, the fluxing agent for the silica and the thinner are generally at least one oxide of a metal such as chromium, cobalt, copper, nickel, selenium, zirconium, titanium, manganese, praseodymium, iron and zinc. These oxides generally act as colorants or opacifiers.

The final composition generally comprises 10 to 70% $SiO_2$ by weight, for example 40 to 70% $SiO_2$ by weight.

The final composition generally comprises 0.3 to 30% $Na_2O$ by weight, for example 20 to 30% $Na_2O$ by weight.

The final composition generally comprises 5 to 30% $B_2O_3$ by weight, for example 5 to 15% $B_2O_3$.

The final composition generally comprises 0.3 to 35% by weight (for example 3 to 20% by weight) of at least one oxide of an element other than Si, Na and B, which is generally at least one of the following metals: chromium, cobalt, copper, nickel, selenium, zirconium, titanium, manganese, praseodymium, iron and zinc.

Especially in the case of the manufacture of a glass color frit, the final composition may comprise 40 to 70% $SiO_2$ by weight, 20 to 30% $Na_2O$ by weight, 5 to 15% $B_2O_3$ by weight and 3 to 20% by weight of at least one oxide of a metal other than Si, Na and B, which is generally at least one of the following metals: chromium, cobalt, copper, nickel, selenium, zirconium, titanium, manganese, praseodymium, iron and zinc.

The final composition may contain oxides of one and the same metal in several different oxidation states. This is especially the case for frits containing a $Cr_2O_3/CrO_3$ mixture or a $CuO/Cu_2O$ mixture. Adjusting the mass ratio of the oxides with different oxidation states within the same composition has an influence on the coloration of the final frit. The invention allows such an adjustment by varying the oxidizing character of the flame of the submerged burners, and more particularly of the submerged burners in the last tank of the furnace according to the invention. The oxidizing character of a flame is varied by adjusting the proportion of oxidizer (air or oxygen) relative to that of the fuel for the flame.

The furnace according to the invention comprises at least two tanks and preferably comprises three tanks. When the furnace comprises two tanks, especially when it manufactures a glass frit, the first tank is heated to a temperature ranging from 1230 to 1350° C. and the second tank to a temperature ranging from 900 to 1150° C. When appropriate, the oxidation state of certain oxides (such as the Cu or Cr oxides) is adjusted in the second tank. When the furnace comprises three tanks, especially when it manufactures a glass frit, the first tank may be heated to a temperature ranging from 1230 to 1350° C., the second heated to a temperature ranging from 1000° C. to 1150° C. and the third to a temperature ranging from 900° C. to 1000° C. When appropriate, the oxidation state of certain oxides (such as the Cu or Cr oxides) is adjusted in this third tank. In the case of a three-tank furnace, in general no material is introduced into the third tank.

Thus, in general the furnace according to the invention comprises at least two tanks in series, or even three tanks in series, two of the tanks each comprising separate charging means, the first tank at least being charged with the silica and the fluxing agent for the silica and the second tank being charged with other materials, such as the thinner and/or at least one oxide of a metal.

According to one version of the invention, the furnace comprises at least three tanks in series, the second being heated to a temperature ranging from 1000° C. to 1150° C. and the third to a temperature ranging from 900° C. to 1000° C., at least one oxide of a metal being introduced into the second tank of the furnace, the oxide having several oxidation states and the submerged burner(s) of the third tank having a sufficiently oxidizing flame for the oxidation state of the oxide to be raised on going from the second to the third tank.

The various tanks of the furnace may, for example, each have a working volume (i.e. a volume equal to the volume of glass contained) ranging from 100 to 500 liters. Especially in the case of a three-tank furnace, the first tank may have a working volume ranging from 250 to 350 liters, the second a working volume ranging from 150 to 250 liters and the third a working volume ranging from 100 to 200 liters. It is recommended to provide each tank, above the working volume occupied by the glass, with a large free volume, for example ranging from 0.3 to 1 times the working volume of said tank.

The glass flows from the first tank to the last tank by gravity. The various tanks in series are connected by throats or spouts.

The tanks may have any suitable shape, with a square, rectangular, polygonal or even circular cross section. A cylindrical shape (circular cross section, the axis of the cylinder being vertical) is preferred as it has the advantage that the glass is more effectively homogenized (less dead, scarcely stirred, volume). This cylindrical shape also has the advantage of it being able to use refractories that are not fashioned for making up the lining of the walls, such as the use of refractory concrete with a hydraulic binder.

The tanks may be cooled by water running over their external surface or by a coiled continuous water circulation pipe welded to said plate.

On leaving the furnace according to the invention, the melt may be conveyed to a conventionally radiation-heated feeder to improve the fining or to a fining zone. In such a zone, the glass is spread out with a shallow depth, for example ranging from 3 mm to 1 cm, and heated so as to be effectively degassed. This fining step is generally carried out between 1050 and 1200° C. The glass is then conveyed to a forming station, such as a rolling station (in the case of frit production). A rolling operation, known per se, is usually carried out between 800 and 950° C. and results in the formation of frit squares.

Thus, the invention also relates to a plant for preparing glass compositions comprising a furnace according to the invention followed by a feeder or a fining zone.

The materials may be introduced using a feed screw.

The invention makes it possible in particular to produce the following color frit compositions:
1. "chromium" frit used to give a green-yellow coloration:
    25% $Na_2O$,
    10% $B_2O_3$,
    2.9% chromium oxide ($Cr_2O_3/CrO_3$ mixture),
    62.1% $SiO_2$;
2. a "cobalt" frit used to give a blue coloration:
    25% $Na_2O$,
    10% $B_2O_3$,
    5% CoO
    60% $SiO_2$;
3. a "copper" ($CuO/Cu_2O$ mixture) frit used to give a blue coloration:
    25% $Na_2O$,
    10% $B_2O_3$,
    14.7% copper oxide ($CuO/Cu_2O$ mixture),
    0.3% CoO,
    50% $SiO_2$.

The frits usually called "nickel" or "selenium" frits may also be produced according to the invention.

The invention also allows the production of tile frits, for example one with the following composition:
    1% $Na_2O$,
    9% $B_2O_3$,
    8% $Al_2O_3$,
    6% CaO,
    3% MgO,
    6% $K_2O$,
    8% $ZrO_2$,
    9% ZnO,
    50% $SiO_2$.

The invention also makes it possible to obtain a zinc glass frit, such as for example the following:

| | |
|---|---|
| ZnO | 18-30% |
| $SiO_2$ | 16-50% |

-continued

| | |
|---|---|
| B$_2$O$_3$ | 10-25% |
| Al$_2$O$_3$ | 1-4% |
| F | 0-5% |
| alkali metal oxides | |
| (usually Na$_2$O and/or K$_2$O) | 6-15% |
| TiO$_2$ | 0-8%, | the latter composition possibly being used in the composition of a black enamel for automobile glazing, as described in EP 1 067 100. This zinc frit may also be added to a glass rich in manganese oxide in order to produce an enamel containing zinc and manganese. Such an enamel is particularly useful as the surface of the perimeter of automobile glazing. However, the invention also allows direct production of the enamel in the furnace according to the invention.

The invention also makes it possible to produce a glass frit such as, for example, the following:

| | |
|---|---|
| Bi$_2$O$_3$ | 50-70% |
| SiO$_2$ | 15-30% |
| B$_2$O$_3$ | 1-13% |
| Na$_2$O | 0.5-7% |
| Al$_2$O$_3$ | 0.5-7% | the latter composition possibly being used in the composition of a black enamel for automobile glazing as described in EP 0 883 579. This frit may thus be added to a manganese derivative (of the oxide or carbonate type) to produce a manganese enamel. Such an enamel is particularly useful as the surface of the perimeter of automobile glazing. However, the invention also allows the manganese enamel to be produced directly by the furnace according to the invention.

The invention allows the direct production of an enamel, for example that having the following composition: 7.7% B$_2$O$_3$, 45.5% Bi$_2$O$_3$, 12.2% SiO$_2$, 1.8% Na$_2$O, 2.8% Al$_2$O$_3$ and 30% MnO$_2$.

FIG. 1 shows a furnace consisting of three tanks (1, 2, 3) according to the invention. These tanks are equipped with submerged burners 4, the gases from which make the glass mass foamy. The level of glass is indicated by 5. The silica and the fluxing agent for the silica are introduced into the first tank at 6. The thinner and the coloring oxides are introduced into the second tank at 7. The glass flows from the first tank to the second tank via the throat 8 and from the second tank to the third via the spout 9. The second tank is equipped with a flue 10 for removing the flue gases. The glass leaves the third tank to undergo a fining step in the zone 13. This zone is heated indirectly by burners 14 through a refractory stone 15. Such an arrangement also contributes to the reduction of losses. The flue gases from the burners 14 escape via the opening 12. The final frit composition is then removed at 16 in order to be conveyed to the rolling station (not shown).

In this furnace configuration, and within the context of producing a chromium glass frit, the first tank may be heated to 1250° C., the second to 1100° C. and the third to 1000° C. The third tank serves above all for adjusting the oxidation state of the chromium oxide by varying the oxidizing character of the flame of the third tank.

The invention claimed is:

1. A process for the continuous preparation of a composition comprising 10 to 70% SiO$_2$, by weight, and 0.3 to 30% Na$_2$O, by weight, in a furnace comprising at least two tanks in series, said process comprising introducing most of the silica (SiO$_2$) and at least one fluxing agent for the silica into a first tank comprising at least one submerged burner, melting most of the silica in the first tank, transferring the silica to a second tank comprising at least one submerged burner, and introducing into the second tank at least one powder selected from the group consisting of a thinner, a metal oxide, and mixtures thereof, wherein the metal oxide is selected from the group consisting of oxides of chromium, cobalt, copper, nickel, selenium, zirconium, titanium, manganese, praseodymium, iron, zinc and mixtures thereof, and wherein the first tank is heated to a higher temperature than the other tank(s) of the furnace, the temperature difference between the first tank and the other tank or tanks is at least 80° C., the first tank is heated to a temperature ranging from 1000 to 1350° C., and the other tank or tanks are heated to a temperature of at most 1150° C.

2. The process as claimed in claim 1, wherein at least 90% of the silica and at least 90% of the fluxing agent for the silica are introduced into the first tank.

3. The process as claimed in claim 2, wherein the furnace is fed with a thinner, at least 90% of which is introduced into the second tank of the furnace.

4. The process as claimed in claim 1, wherein the first tank is heated to a temperature ranging from 1230 to 1350° C.

5. The process as claimed in claim 1, wherein the composition comprises, 5 to 30% B$_2$O$_3$, by weight, and 0.3 to 35%, by weight, of said metal oxide.

6. The process as claimed in claim 5, wherein the final composition is a frit, comprising 40 to 70% SiO$_2$, by weight, 20 to 30% Na$_2$O, by weight, 5 to 15% B$_2$O$_3$, by weight, and 3 to 20%, by weight, of said metal oxide.

7. The process as claimed in claim 1, wherein at least one oxide of a metal is introduced into the second tank of the furnace.

8. The process as claimed in claim 7, wherein the furnace comprises at least three tanks in series, the second being heated to a temperature ranging from 1000° to 1150° C., and the third to a temperature ranging from 900° to 1000° C.

9. The process as claimed in claim 8, wherein the oxide has several oxidation states, and the submerged burner(s) of the third tank has/have a sufficiently oxidizing flame for the oxidation state of the oxide to be raised on going, from the second to the third tank.

10. The process as claimed in claim 1, wherein the composition is a color frit or a tile frit or an enamel.

11. The process as claimed in claim 1, further comprising conveying the composition comprising silica from the furnace to a radiation-heated feeder.

12. A process for the continuous preparation of a composition comprising silica in a furnace comprising at least two tanks in series, said process comprising introducing most of the silica and at least one fluxing agent for the silica into a first tank comprising at least one submerged burner, melting most of the silica in the first tank, transferring the silica to a second tank comprising at least one submerged burner, and introducing into the second tank at least one oxide selected from the group consisting of boron oxide, zinc oxide and selenium oxide, wherein the first tank is heated to a higher temperature than the other tank(s) of the furnace, the temperature difference between the first tank and the other tank or tanks is at least 80° C., the first tank is heated to a temperature ranging from 1000 to 1350° C., and the other tank or tanks are heated to a temperature of at most 1150° C., and wherein the composition comprises 10 to 70% SiO$_2$, by weight, 0.3 to 30% Na$_2$O, by weight, 5 to 30% B$_2$O$_3$, by weight, and 0.3 to 35%, by weight, of at least one additional oxide of a metal.

13. The process as claimed in claim 1, further comprising conveying the composition comprising silica from the furnace to a fining zone.

14. A process for the continuous preparation of a composition comprising 10 to 70% $SiO_2$, by weight, and 0.3 to 30% $Na_2O$, by weight, in a furnace comprising at least two tanks in series, said tanks each comprising at least one burner submerged in the melt, said process comprising introducing most of the silica ($SiO_2$) in the form of grains and at least one fluxing agent into the first tank, melting most of the silica and fluxing agent in the first tank to form molten silica, transferring the molten silica to a second tank, and introducing into the second tank at least one thinner or at least one metal oxide, wherein the metal oxide is selected from the group consisting of oxides of chromium, cobalt, copper, nickel, selenium, zirconium, titanium, manganese, praseodymium, iron, zinc and mixtures thereof, and wherein the first tank is heated to a higher temperature than the other tank(s) of the furnace, the first tank is heated to a temperature ranging from 1000 to 1350° C., and the other tank or tanks are heated to a temperature of at most 1150° C.

15. The process as claimed in claim 14, wherein at least 90% of the silica and at least 90% of the fluxing agent for the silica are introduced into the first tank.

16. The process as claimed in claim 15, wherein the furnace is fed with a thinner, at least 90% of which is introduced into the second tank of the furnace.

17. The process as claimed in claim 14, wherein the temperature difference between the first tank and the other tank or tanks is at least 80° C.

18. The process as claimed in claim 17, wherein the first tank is heated to a temperature ranging from 1230 to 1350° C.

19. The process as claimed in claim 14, wherein the composition comprises, 5 to 30% $B_2O_3$, by weight, and 0.3 to 35%, by weight, of said metal oxide.

20. The process as claimed in claim 19, wherein the final composition is a frit, comprising 40 to 70% $SiO_2$, by weight, 20 to 30% $Na_2O$, by weight, 5 to 15% $B_2O_3$, by weight, and 3 to 20%, by weight, of said metal oxide.

21. The process as claimed in claim 14, wherein at least one oxide of a metal is introduced into the second tank of the furnace.

22. The process as claimed in claim 21, wherein the furnace comprises at least three tanks in series, the second being heated to a temperature ranging from 1000° to 1150° C., and the third to a temperature ranging from 900° to 1000° C.

23. The process as claimed in claim 22, wherein the oxide has several oxidation states, and the submerged burner(s) of the third tank has/have a sufficiently oxidizing flame for the oxidation state of the oxide to be raised on going, from the second to the third tank.

24. The process as claimed in claim 14, wherein the composition is a color frit or a tile frit or an enamel.

25. The process as claimed in claim 14, wherein said furnace comprises at least three tanks in series and each tank comprises at least one submerged burner.

26. The process as claimed in claim 12, further comprising conveying the composition comprising silica from the furnace to a radiation-heated feeder.

27. The process as claimed in claim 12, further comprising conveying the composition comprising silica from the furnace to a fining zone.

28. A process for the continuous preparation of a composition comprising 10 to 70% $SiO_2$, by weight, and 0.3 to 30% $Na_2O$, by weight, in a furnace comprising at least two tanks in series, said process comprising introducing most of the silica ($SiO_2$) and at least one fluxing agent for the silica into a first tank comprising at least one submerged burner, melting and homogenizing most of the silica in the first tank, transferring the silica to a second tank comprising at least one submerged burner, introducing into the second tank at least one powder selected from the group consisting of a thinner, a metal oxide, and mixtures thereof, wherein the metal oxide is selected from the group consisting of oxides of chromium, cobalt, copper, nickel, selenium, zirconium, titanium, manganese, praseodymium, iron, zinc and mixtures thereof, and homogenizing the contents of the second tank, wherein the first tank is heated to a higher temperature than the other tank(s) of the furnace, the temperature difference between the first tank and the other tank or tanks is at least 80° C., the first tank is heated to a temperature ranging from 1000 to 1350° C., and the other tank or tanks are heated to a temperature of at most 1150° C.

29. A process for the continuous preparation of a composition comprising 50 to 70% $Bi_2O_3$, by weight, 15 to 30% $SiO_2$ (silica) by weight, 1 to 13% $B_2O_3$, by weight, 0.5 to 7% $Na_2O$, by weight, and 0.5 to 7% $Al_2O_3$, by weight, in a furnace comprising at least two tanks in series, said process comprising introducing most of the silica and at least one fluxing agent for the silica into a first tank comprising at least one submerged burner, melting most of the silica in the first tank, transferring the silica to a second tank comprising at least one submerged burner, and introducing into the second tank at least one powder selected from the group consisting of a thinner, a metal oxide, and mixtures thereof, wherein the first tank is heated to a higher temperature than the other tank(s) of the furnace, the temperature difference between the first tank and the other tank or tanks is at least 80° C., the first tank is heated to a temperature ranging from 1000 to 1350° C., and the other tank or tanks are heated to a temperature of at most 1150° C.

* * * * *

UNITED STATES PATENT AND TRADEMARK OFFICE
CERTIFICATE OF CORRECTION

PATENT NO. : 8,196,432 B2  
APPLICATION NO. : 10/522723  
DATED : June 12, 2012  
INVENTOR(S) : Remi Jacques et al.

Page 1 of 1

It is certified that error appears in the above-identified patent and that said Letters Patent is hereby corrected as shown below:

On the title page, Item (75), inventors: "Cheverny" should read --Compiegne--.

Signed and Sealed this
Fourteenth Day of August, 2012

David J. Kappos
*Director of the United States Patent and Trademark Office*